United States Patent
Oki et al.

(10) Patent No.: US 7,029,399 B2
(45) Date of Patent: Apr. 18, 2006

(54) POWER TRANSMISSION SYSTEM

(75) Inventors: Toshiyuki Oki, Shizuoka-ken (JP); Yuuichiro Noro, Shizuoka-ken (JP)

(73) Assignee: NTN Corporation, Osaka-Fu (JP)

( * ) Notice: Subject to any disclaimer, the term of this patent is extended or adjusted under 35 U.S.C. 154(b) by 0 days.

(21) Appl. No.: 10/228,277

(22) Filed: Aug. 27, 2002

(65) Prior Publication Data
US 2003/0042690 A1    Mar. 6, 2003

(30) Foreign Application Priority Data
Sep. 4, 2001    (JP)    ................ 2001-267464

(51) Int. Cl.
F16D 3/84    (2006.01)

(52) U.S. Cl. .................. 464/175; 277/641; 277/922

(58) Field of Classification Search ................ 464/144, 464/173, 175; 277/636, 641, 922
See application file for complete search history.

(56) References Cited

U.S. PATENT DOCUMENTS

| | | | |
|---|---|---|---|
| 1,967,842 A * | 7/1934 | Raviola et al. ............. 464/173 |
| 2,227,687 A * | 1/1941 | Wollner ..................... 464/175 |
| 3,633,382 A * | 1/1972 | Westercamp ............... 464/144 |
| 3,767,211 A * | 10/1973 | Amphlett | |
| 4,121,845 A * | 10/1978 | Reynolds et al. ....... 277/922 X |
| 4,436,310 A | 3/1984 | Sawabe et al. | |
| 4,620,729 A * | 11/1986 | Kauffman | |
| 5,176,576 A * | 1/1993 | Moulindt ................. 277/636 X |
| 5,183,351 A * | 2/1993 | Schneider ................. 277/636 |
| 6,293,873 B1 * | 9/2001 | Iwano et al. ................. 464/173 |
| 6,354,604 B1 * | 3/2002 | Nicolai ..................... 277/641 |
| 6,357,956 B1 * | 3/2002 | Zebolsky et al. ....... 277/637 X |
| 6,361,444 B1 * | 3/2002 | Cheney et al. .............. 464/175 |
| 6,530,843 B1 * | 3/2003 | Miller et al. ................. 464/145 |

FOREIGN PATENT DOCUMENTS

| | | |
|---|---|---|
| DE | 32 10 389 A1 | 4/1983 |
| DE | 197 36 546 A1 | 3/1999 |
| DE | 100 20 641 A1 | 11/2000 |

* cited by examiner

*Primary Examiner*—Greg Binda
(74) *Attorney, Agent, or Firm*—Arent Fox PLLC

(57) ABSTRACT

A power transmission system which facilitates positioning of gaskets to ensure their sealing performance. The power transmission system includes a constant velocity universal joint provided with an inner ring having a plurality of track grooves formed on its outer periphery and an outer ring having a plurality of track grooves formed on its inner periphery. The inner ring is disposed on the side of the inner periphery of the outer ring, wherein balls are accommodated within ball tracks formed with the track grooves of the inner and outer rings and retained by a cage. The power transmission system further includes a first shaft fitted into the inner ring to enable torque transmission, a boot with an adapter attached to the first shaft and an end portion of the outer ring to seal the constant velocity universal joint, a second shaft coupled to the outer ring with bolts, and an end plate disposed between a flange of the second shaft and the other end portion of the outer ring to seal the constant velocity universal joint. The power transmission system is configured such that gaskets are adhered with adhesive sheets to the adapter and the end plate which are attacked to the ends of the outer ring.

9 Claims, 8 Drawing Sheets

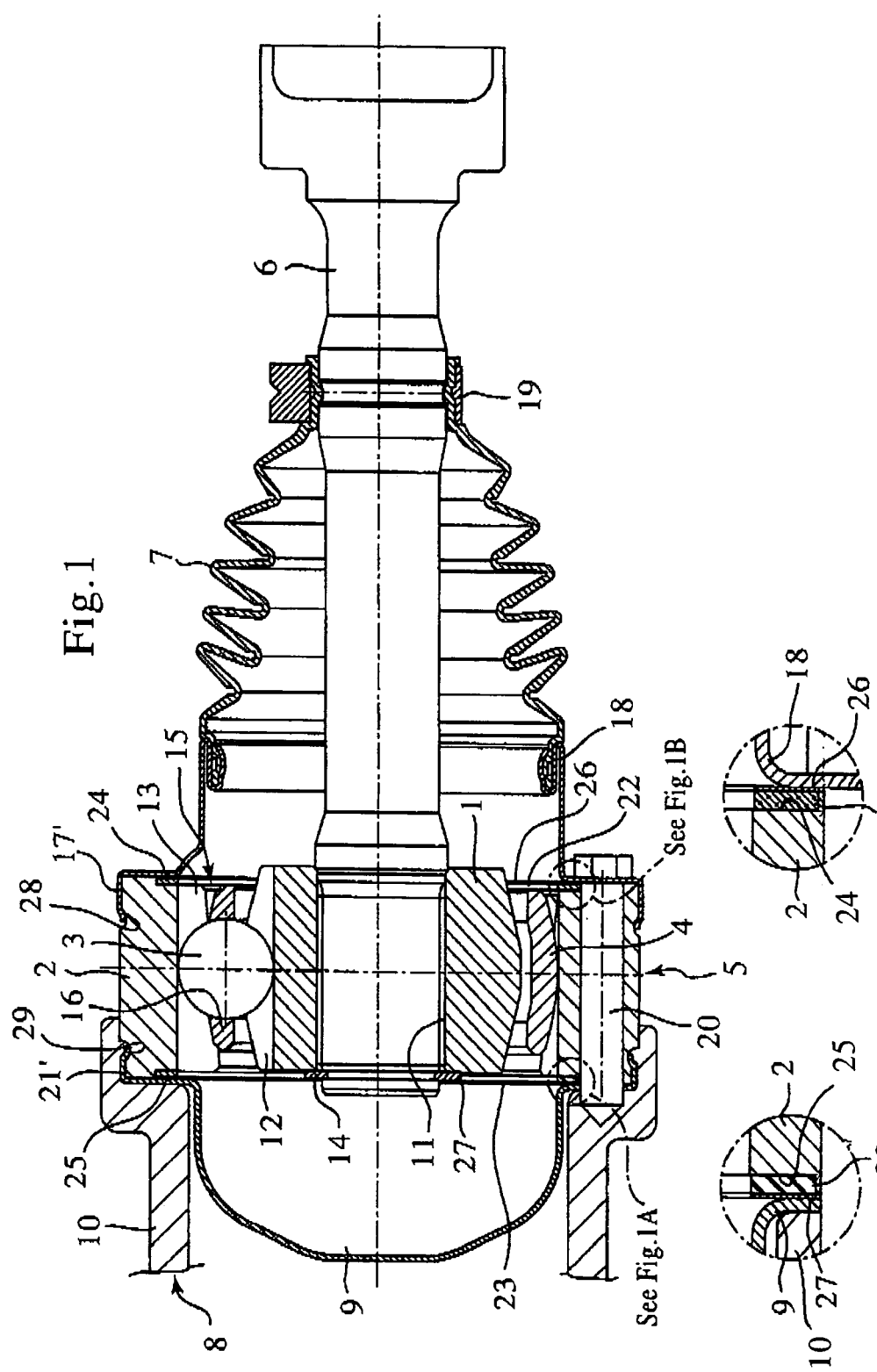

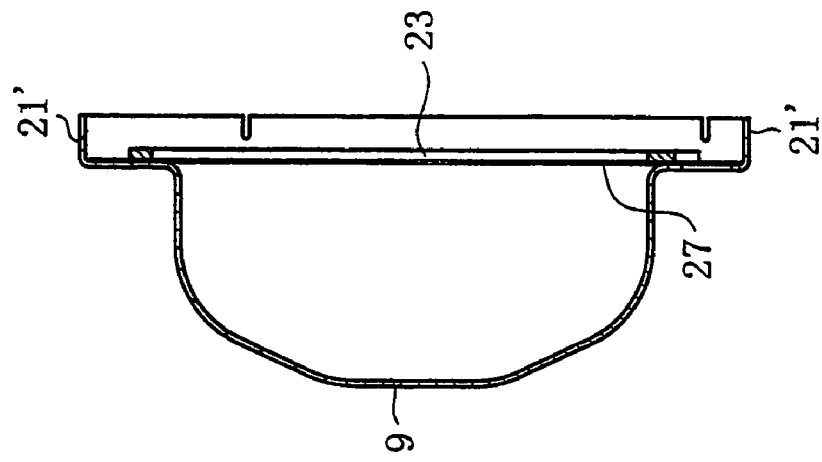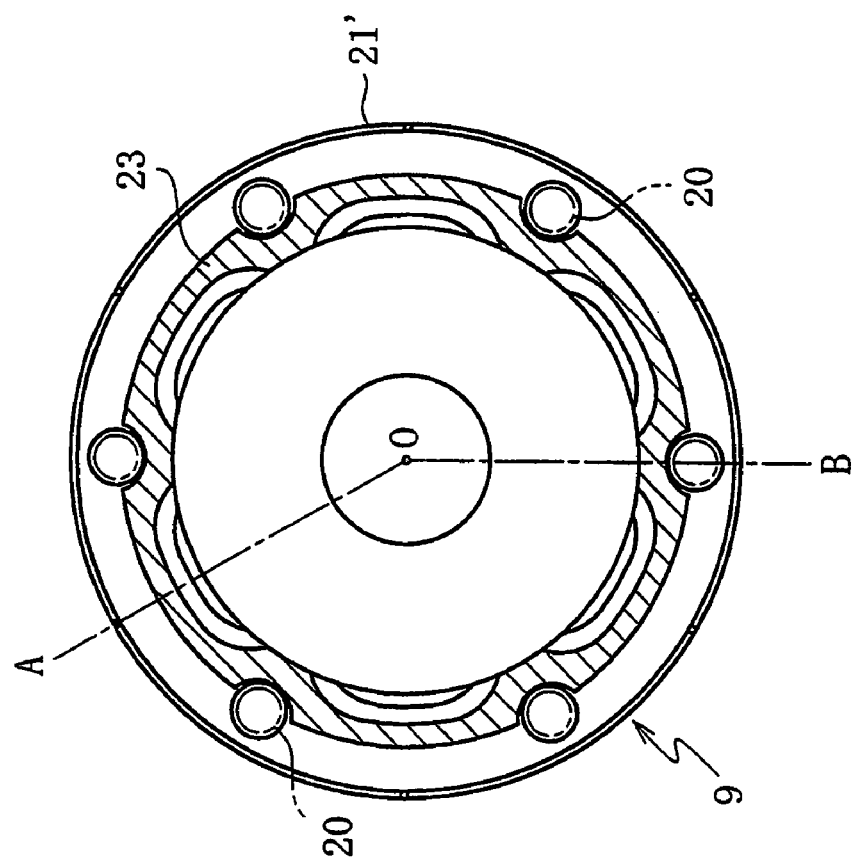

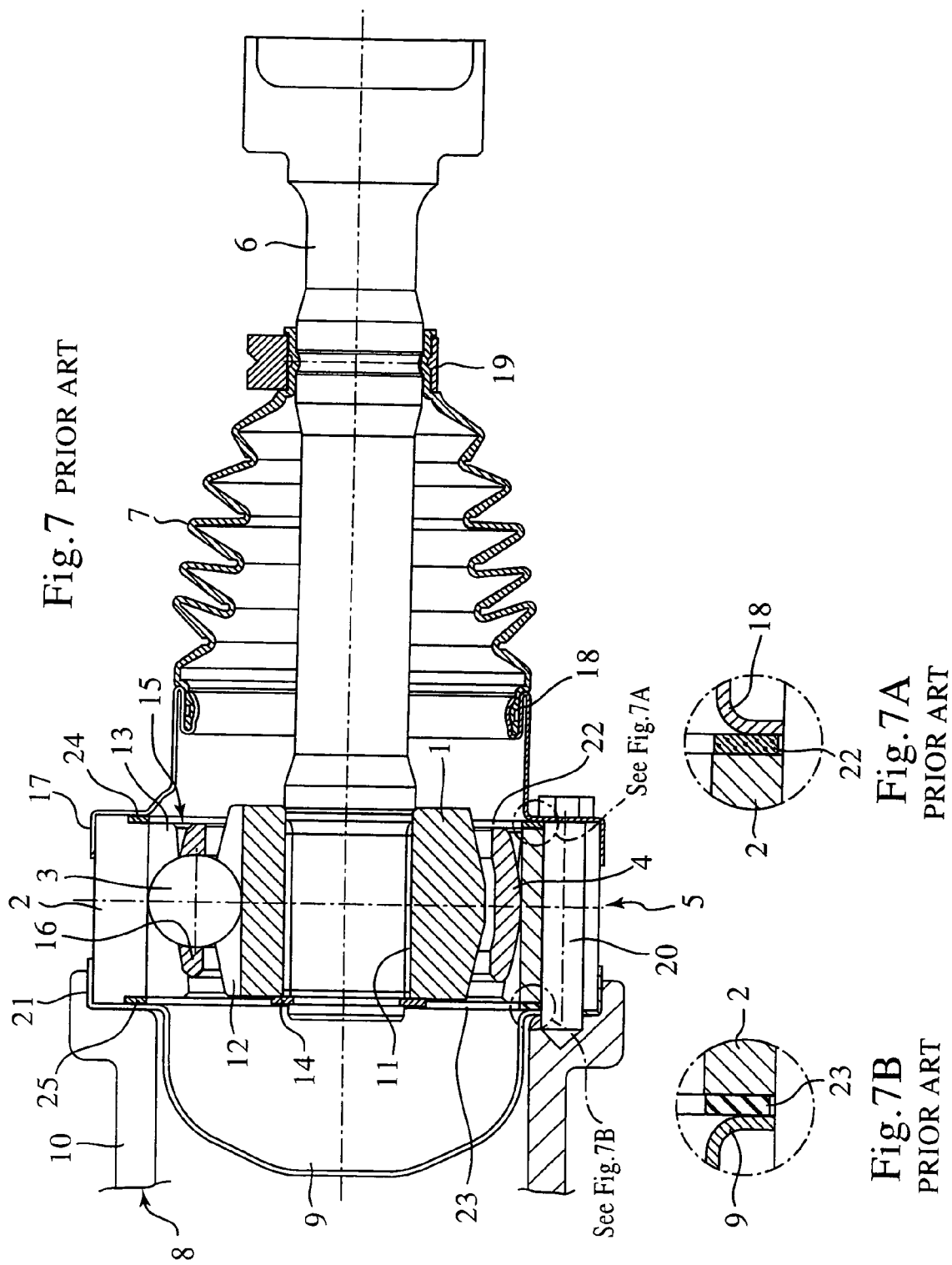

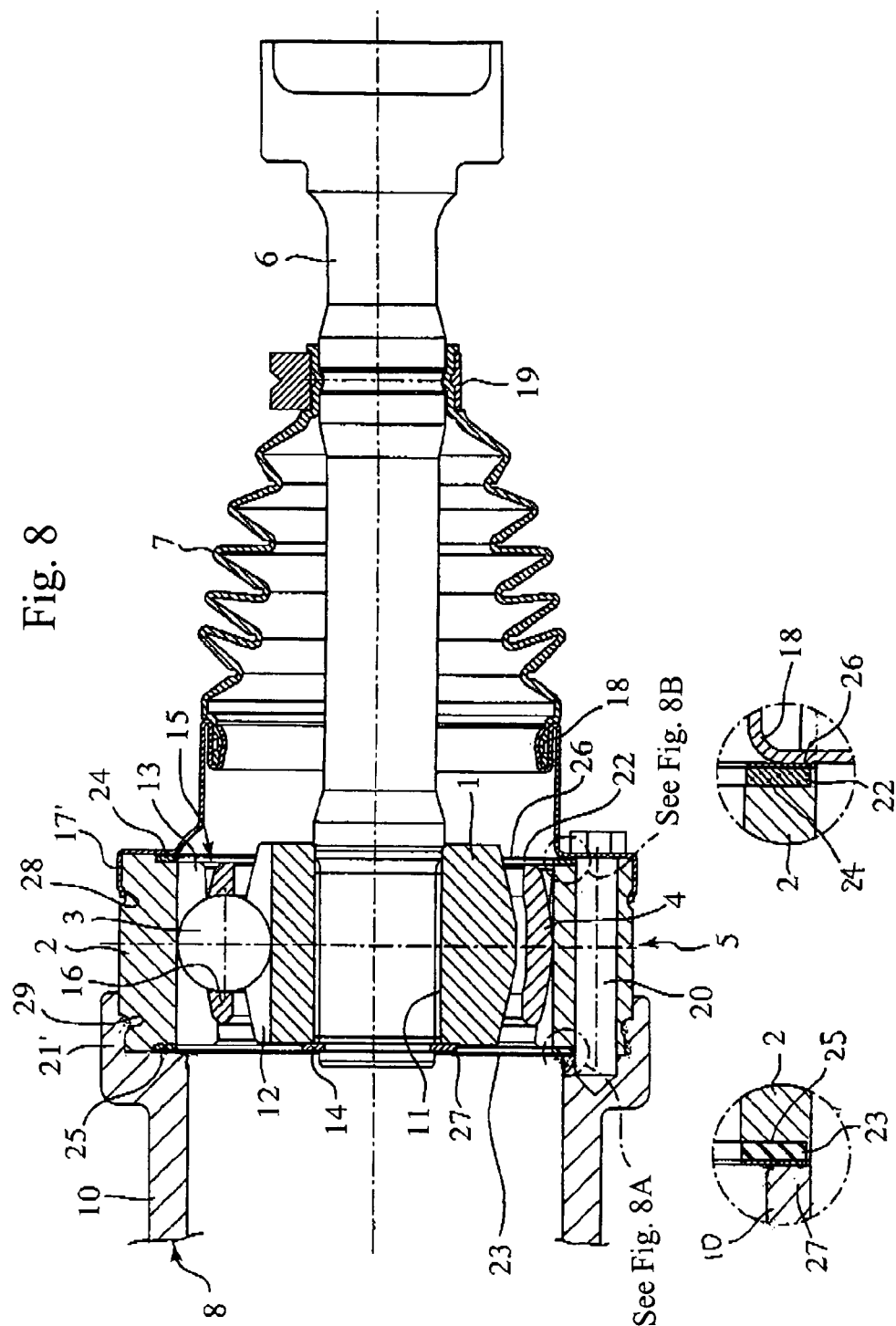

POWER TRANSMISSION SYSTEM

BACKGROUND OF THE INVENTION

1. Field of the Invention

The present invention relates to a power transmission system that has a sealing structure, such as an end plate and a boot with an adapter, for sealing a constant velocity universal joint incorporated into an automotive propeller shaft or a drive shaft.

2. Description of the Related Art

As shown in FIG. 7, a power transmission system with a propeller shaft or a drive shaft for use in automobiles includes a so-called Lobro (or cross groove) constant velocity universal joint 5 having an inner ring 1, an outer ring 2, balls 3, and a cage 4 as its primary components. The power transmission system further includes a first shaft 6 (a stub shaft) coupled to the inner ring 1 of the constant velocity universal joint 5, and a boot 7 with an adapter attached to the first shaft 6 and the constant velocity universal joint 5 to seal the constant velocity universal joint 5. The power transmission system still further includes a second shaft 8 (a stub shaft) coupled to the outer ring 2 of the constant velocity universal joint 5 and provided at an end with a companion flange 10, and an end plate 9 disposed between the companion flange 10 of the second shaft 8 and the constant velocity universal joint 5 to seal the constant velocity universal joint 5.

The inner ring 1 of the constant velocity universal joint 5 has a splined bore 11 at its center and a plurality of track grooves 12 on its outer peripheral surface. The first shaft 6 is fitted into the splined bore 11 of the inner ring 1 to enable torque transmission, and then fixedly positioned axially in the inner ring 1 with a snap ring or a circlip 14 installed in an annular groove of the first shaft 6.

The outer ring 2 is disposed on the outer periphery of the inner ring 1 and provided on the inner peripheral surface of the outer ring 2 with the same number of track grooves 13 as that of the track grooves 12 of the inner ring 1.

The track grooves 12 of the inner ring 1 and the track grooves 13 of the outer ring 2 form angles opposite to each other with respect to the axial line. The track grooves 12 of the inner ring 1 are paired with the track grooves 13 of the outer ring 2 to form ball tracks 15, with the balls 3 being accommodated at the intersections between the track grooves 12, 13 for the ball tracks 15. The cage 4 is interposed between the inner ring 1 and the outer ring 2 to hold the balls 3 within pockets 16 of the cage 4. The boot 7 with an adapter for sealing the constant velocity universal joint 5 at an end is disposed between one axial end portion of the outer ring 2 and the first shaft 6 in order to prevent leakage of grease filled in the constant velocity universal joint 5 and intrusion of foreign material from outside. The boot 7 with an adapter includes a pleated rubber or plastic boot 7 having a reduced-diameter end portion and an enlarged-diameter end portion, and a metallic adapter 18 having a cylindrical portion 17 at an end. The enlarged-diameter end portion of the boot 7 and the other end of the adapter 18 are jointed together by caulking, and the reduced-diameter end portion of the boot 7 is fastened to the first shaft 6 with a boot band 19. Additionally, the cylindrical portion 17 of the adapter 18 is fitted onto an end portion of the outer ring 2 to be secured to the outer ring 2 with bolts 20.

The end plate 9 for sealing the constant velocity universal joint 5 at the other end is disposed between the other axial end portion of the outer ring 2 and the companion flange 10 in order to prevent leakage of grease filled in the constant velocity universal joint 5 and intrusion of foreign material from outside. The end plate 9 is formed in the shape of a bowl and provided at one end with a cylindrical portion 21, which is fitted onto the end portion of the outer ring 2 and sandwiched between the companion flange 10 and the end portion of the outer ring 2 to be secured with the bolts 20.

The aforementioned power transmission system is designed to prevent leakage of grease filled in the constant velocity universal joint 5 and intrusion of foreign material from outside. To this end, the boot 7 with an adapter for sealing the constant velocity universal joint 5 at an end is disposed between the one axial end portion of the outer ring 2 and the first shaft 6, and the end plate 9 for sealing the constant velocity universal joint 5 at the other end is disposed between the other axial end portion of the outer ring 2 and the companion flange 10.

To allow the adapter 18 and the end plate 9 to provide improved sealing performance, a gasket 22 is interposed between the adapter 18 and one end face of the outer ring 2 (see FIG. 7A), and a gasket 23 is interposed between the end plate 9 and the other end face of the outer ring 2 (see FIG. 7B). That is, annular recessed portions 24, 25 are provided on the inner peripheral edges at both axial end faces of the outer ring 2, and then the adapter 18 and the end plate 9 are secured to the outer ring 2 with the bolts 20, with the gaskets 22, 23 being fitted in the recessed portions 24, 25, respectively.

However, when the adapter 18 and the end plate 9 are attached to the outer ring 2, it is very difficult to position the gaskets 22, 23 at the recessed portions 24, 25 of the outer ring 2. Improper positioning of the gaskets 22, 23 would cause the gaskets 22, 23 to be dislocated, thereby impairing their sealing performance and making it difficult to prevent leakage of grease filled in the constant velocity universal joint 5 and intrusion of foreign material from outside.

In particular, in terms of the material of the gaskets 22, 23, rubber or cork gaskets are preferable to fluid or vulcanized rubber gaskets since they are inexpensive and impervious to impacts. However, there were problems with the aforementioned adapter 18 and the end plate 9 that they could be easily dislocated when incorporated into the outer ring 2.

SUMMARY OF THE INVENTION

It is an object of the present invention to provide a power transmission system that is configured to facilitate positioning of gaskets to ensure their sealing performance.

The present invention provides a power transmission system that includes: a constant velocity universal joint having an inner joint member disposed rotatably and axially movably via rollers on the side of an inner periphery of an outer joint member; a first shaft fitted into the inner joint member to enable torque transmission; a boot with an adapter attached to the first shaft and one end portion of the outer joint member, respectively, to seal the constant velocity universal joint at one end; and a second shaft having a flange coupled to the other end portion of the outer joint member with bolts. The power transmission system is characterized in that a gasket is adhered with an adhesive sheet to at least one of the one end portion of the outer joint member and the adapter attached to the end portion, or at least one of the other end portion of the outer joint member and a flange end portion of the second shaft coupled to the other end portion.

In the present invention, the power transmission system has a gasket adhered with an adhesive sheet to at least one of an end portion of an outer joint member and the adapter attached to the end portion, or at least one of the other end portion of the outer joint member and a flange end portion of the second shaft coupled to the other end portion. When the adapter or the flange of the second shaft is attached to the outer joint member, this allows the gasket to be positioned with ease relative to the outer joint member, thereby making it possible to prevent the gasket from being dislocated and ensure reliable sealing performance. Consequently, this makes it possible to provide a highly reliable long-life power transmission system.

The power transmission system may also be configured such that an end plate for sealing the constant velocity universal joint at the other end of the outer joint member is disposed between the flange of the second shaft and the other end portion. In this case, a gasket is adhered with an adhesive sheet to at least one of an, end portion of the outer joint member and the adapter attached to the end portion, or at least one of the other end portion of the outer joint member and the end plate coupled to the other end portion. When the adapter or the end plate is incorporated into the outer joint member, this allows the gasket to be positioned with ease relative to the outer joint member, thereby making it possible to prevent the gasket from being dislocated and ensure reliable sealing performance. This provides the same effect as in the case of the adapter and the flange of the second shaft.

In the aforementioned configuration, a cylindrical portion is formed on at least one of the end plate and the adapter at an outer periphery thereof and externally fitted into an annular groove formed on an outer peripheral surface at an end portion of the outer joint member, the cylindrical portion being caulked radially inwardly at its peripheral edge to be permanently coupled to the annular groove. This allows the end plate or the adapter to be firmly incorporated into the outer joint member.

In the aforementioned configuration, the outer diameter of the end plate is generally equal to a pitch circle diameter of the bolts, and at least two projected pieces extending axially toward the outer joint member are formed on an outer peripheral edge of the end plate, the projected pieces engaging recessed portions formed on an outer peripheral end portion of the outer joint member. Thus, the flange of the second shaft is socket fitted onto the outer peripheral end portion of the outer joint member.

This allows the flange of the second shaft to directly contact the end portion of the outer joint member closer to its outer periphery than the end plate. This in turn makes it possible to provide highly accurate alignment between the second shaft and the outer joint member of the constant velocity universal joint, or between the second shaft and the first shaft via the constant velocity universal joint.

The present invention is applicable to a power transmission system such as a propeller shaft or a drive shaft with a double offset constant velocity universal joint which is formed to allow a plurality of track grooves to extend axially on the inner peripheral surface of the outer joint member, and allow a plurality of track grooves, opposite to the track grooves of the outer joint member, to extend axially on the outer peripheral surface of the inner joint member. Additionally, the double offset constant velocity universal joint is configured such that balls are accommodated within ball tracks formed by pairs of the track grooves of the outer joint member and the track grooves of the inner joint member, and retained in a cage. The invention is also applicable to a power transmission system such as a propeller shaft or a drive shaft with a Lobro constant velocity universal joint (LJ) in which the track grooves of the outer joint member and the track grooves of the inner joint member are inclined opposite to each other by a predetermined angle with respect to an axial line. Furthermore, the invention is applicable to a power transmission system such as a propeller shaft or a drive shaft with a tripod constant velocity universal joint (TJ) which includes an outer joint member having three track grooves formed axially on its inner peripheral portion, each track groove having, on its both sides, an axial roller guide surface, respectively. The tripod constant velocity universal joint further includes an inner joint member having three leg shafts projected radially; rollers accommodated within track grooves of the outer joint member; and a ring externally fitted onto the leg shafts to rotatably support the rollers. The tripod constant velocity universal joint is configured such that the rollers are movable in the axial direction of the outer Joint member along the roller guide surfaces.

BRIEF DESCRIPTION OF THE DRAWINGS

In the accompanying drawings:

FIG. 1 is a cross sectional view illustrating an embodiment of a power transmission system according to the present invention;

FIG. 1A illustrates an enlarged view of an adhesive sheet used to adhere a gasket to an inner end face of an end plate;

FIG. 1B illustrates an enlarged view of a gasket adhered with an adhesive sheet to an inner end face of an adapter that contacts an outer ring;

FIG. 3(a) is a side view illustrating the endplate and the gasket which have been incorporated into the power transmission system of FIG. 1, and FIG. 3(b) is a cross sectional view taken along line A-O-B of FIG. 3(a);

FIG. 7 is a cross sectional view illustrating a prior-art power transmission system;

FIG. 7A illustrates an enlarged view of a casket interposed between an adapter and an outer ring; and FIG. 7B illustrates an enlarged view of a gasket interposed between an end plate and another end face of the outer ring.

FIG. 8 is a cross sectional view illustrating a further embodiment of a power transmission system according to the present invention;

FIG. 8A illustrates an enlarged view of an adhesive sheet used to adhere a casket to an end portion of a companion flange of a second shaft;

FIG. 8B illustrates an enlarged view of a gasket adhered with an adhesive sheet to an inner end face of an adapter that contacts an outer ring;

DETAILED DESCRIPTION OF THE PREFERRED EMBODIMENTS

Figure 2B:
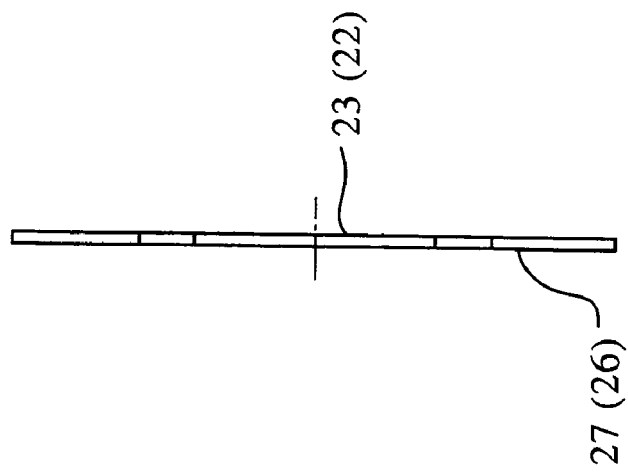
FIG. 2(b) is a front view of FIG. 2(a)

Now, a power transmission system such as a propeller shaft or a drive shaft according to an embodiment of the present invention will be explained below in detail. Reference is now made to the drawings wherein the same components as those of FIG. 7 are given the same reference numerals.

As shown in FIG. 1, the power transmission system according to this embodiment includes a Lobro (or cross groove) constant velocity universal joint 5 having an inner joint member or an inner ring 1, an outer joint member or an outer ring 2, balls 3, and a cage 4 as its primary components. The power transmission system further includes a first shaft 6 (a stub shaft) coupled to the inner ring 1 of the constant velocity universal joint 5, and a boot 7 with an adapter attached to the first shaft 6 and the constant velocity universal joint 5 to seal the constant velocity universal joint 5. The power transmission system still further includes a second shaft 8 (a stub shaft) coupled to the outer ring 2 of the constant velocity universal joint 5 and provided at an end with a companion flange 10, and an end plate 9 disposed between the companion flange 10 of the second shaft 8 and the constant velocity universal joint 5 to seal the constant velocity universal joint 5.

The inner ring 1 of the constant velocity universal joint 5 has a splined bore 11 at its center and a plurality of track grooves 12 on its outer peripheral surface. The first shaft 6 is fitted into the splined bore 11 of the inner ring 1 to enable torque transmission, and then fixedly positioned axially in the inner ring 1 with a snap ring or a circlip 14 installed in an annular groove of the first shaft 6.

The outer ring 2 is disposed on the outer periphery of the inner ring 1 and provided on the inner peripheral surface with the same number of track grooves 13 as that of the track grooves 12 of the inner ring 1.

The track grooves 12 of the inner ring 1 and the track grooves 13 of the outer ring 2 form angles opposite to each other with respect to the axial line. The track grooves 12 of the inner ring 1 are paired with the track grooves 13 of the outer ring 2 to form ball tracks 15, with the balls 3 being accommodated at the intersections between the track grooves 12, 13 for the ball tracks 15. The cage 4 is interposed between the inner ring 1 and the outer ring 2 to hold the balls 3 within pockets 16 of the cage 4.

The boot 7 with an adapter for sealing the constant velocity universal joint 5 at an end is disposed between one axial end portion of the outer ring 2 and the first shaft 6 in order to prevent leakage of grease filled in the constant velocity universal joint 5 and intrusion of foreign material from outside. The boot 7 with an adapter includes a pleated rubber or plastic boot 7 having a reduced-diameter end portion and an enlarged-diameter end portion, and a metallic adapter 18 having a cylindrical portion 17' at an end. The enlarged-diameter end portion of the boot 7 and the other end of the adapter 18 are jointed together by caulking, and the reduced-diameter end portion of the boot 7 is fastened to the first shaft 6 with a boot band 19. Additionally, the cylindrical portion 17' of the adapter 18 is fitted onto an end portion of the outer ring 2 and secured to the outer ring 2 with bolts 20.

The end plate 9 for sealing the constant velocity universal joint 5 at the other end is disposed between the other axial end portion of the outer ring 2 and the companion flange 10 in order to prevent leakage of grease filled in the constant velocity universal joint 5 and intrusion of foreign material from outside. The end plate 9 is formed in the shape of a bowl and provided at one end with a cylindrical portion 21', which is fitted onto the end portion of the outer ring 2 and sandwiched between the companion flange 10 and the end portion of the outer ring 2 to be secured with the bolts 20.

Figure 2A:
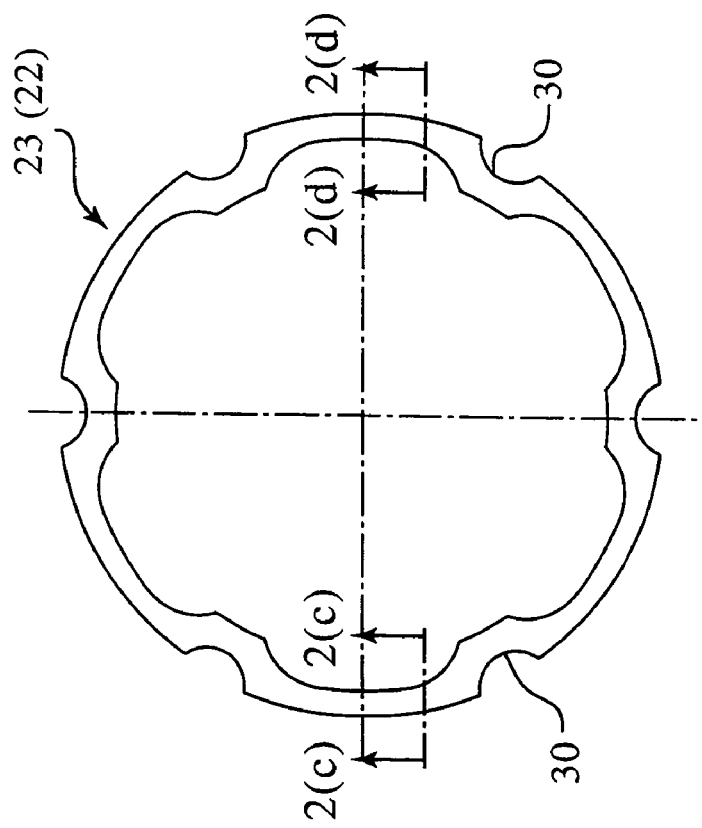
FIG. 2(a) is a side view illustrating gaskets to be attached to the endplate of FIG. 1.
Figure 2D:
FIGS. 2(c) and 2(d) are cross-sectional views of the gaskets shown in FIGS. 2(a) and 2(b)
Figure 2C:
Figure 6:
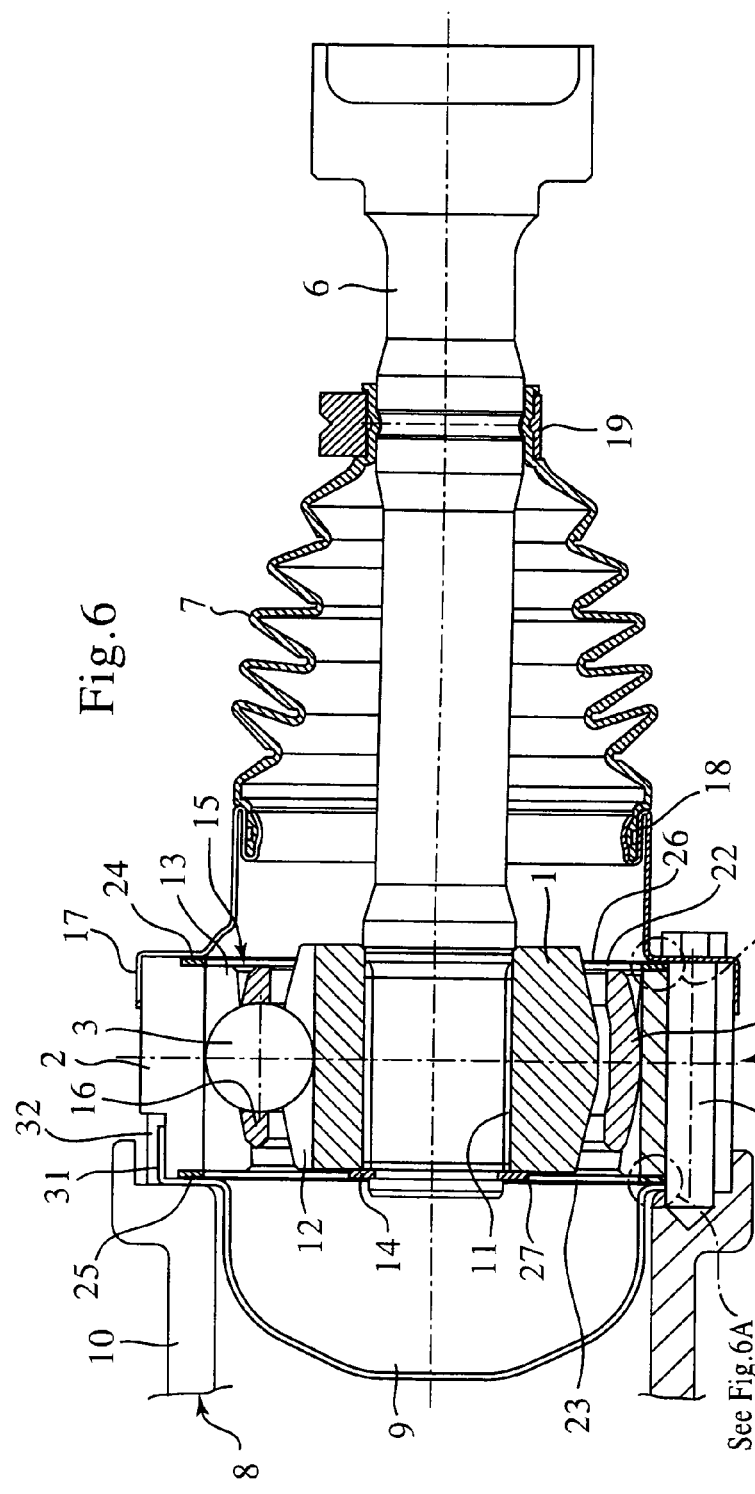
FIG. 6 is a cross sectional view illustrating a power transmission system with the endplate of FIG. 4 attached to the constant velocity universal joint of FIG. 5.
Figure 6B:
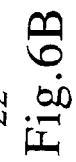
FIG. 6B illustrates an enlarged view of a casket adhered with an adhesive sheet to an inner end face of an adapter that contacts an outer ring.
Figure 6A:
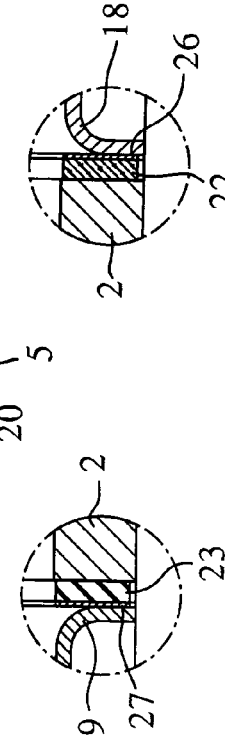
FIG. 6A illustrates an enlarged view of an adhesive sheet used to adhere a gasket to an inner end face of an end plate.

To allow the adapter 18 and the end plate 9 to provide improved sealing performance, a gasket 22 is interposed between the adapter 18 and one end face of the outer ring 2, and a gasket 23 is interposed between the end plate 9 and the other end face of the outer ring 2 (see FIGS. 2(a) and 2(b)). The gaskets 22, 23 are preferably made of a material, such as rubber (FIG. 6A) or cork (FIG. 6B), which is inexpensive and impervious to impacts. On the outer periphery of the gaskets 22, 23, there are provided notches 30 for accommodating the bolts 20 that penetrate the outer ring 2.

In this embodiment, as shown in FIGS. 1A, 3(a), 3(b) and 6A, an adhesive sheet 27 is used to adhere the gasket 23 to the inner end face of the end plate 9 (the shaded portion in FIG. 3(a)) which contacts an end face of the outer ring 2. The gasket 23 is thus adhered with the adhesive sheet 27 to the end plate 9, which is then attached to the other axial end portion of the outer ring 2. At this time, the gasket 23 is fitted into an annular recessed portion 25 that is provided on the inner peripheral edge of the end face of the outer ring 2, such that the cylindrical portion 21' at the end portion of the end plate 9 is fitted onto the outer peripheral end portion of the outer ring 2. When the end plate 9 is fitted onto the outer ring 2, the gasket 23 secured to the end plate 9 with the adhesive sheet 27 facilitates the positioning of the gasket 23 with respect to the outer ring 2, thereby preventing the gasket 23 from being dislocated and providing reliable sealing performance. The cylindrical portion 21' of the end plate 9 is externally fitted into an annular groove 29 formed on the outer peripheral surface of the end portion of the outer ring 2, and then caulked radially inwardly at its peripheral edge to be thereby permanently coupled thereto. This allows the end plate 9 to be firmly incorporated into the outer ring 2.

It may also be acceptable to adhere the gasket 23 with an adhesive sheet to the annular recessed portion 25 that is provided on the inner peripheral edge of the end face of the outer ring 2. The end plate 9 is attached to the other axial end portion of the outer ring 2 to which the gasket 23 has been adhered with the adhesive sheet. When the end plate 9 is fitted onto the outer ring 2, the gasket 23 secured to the end plate 9 with the adhesive sheet facilitates the positioning of the gasket 23 with respect to the outer ring 2, thereby preventing the gasket 23 from being dislocated and providing reliable sealing performance as in the case of the gasket 23 adhered to the end plate 9 with the adhesive sheet 27.

Without an end plate 9 installed, as illustrated in FIGS. 8 and 8A, it is possible to adhere the gasket 23 with the adhesive sheet 27 to the end portion of the companion flange 10 of the second shaft 8. When the companion flange 10 is fitted onto the outer ring 2, the gasket 23 secured to the companion flange 10 with the adhesive sheet 27 facilitates the positioning of the gasket 23 with respect to the outer ring 2, thereby preventing the gasket 23 from being dislocated and providing reliable sealing performance.

Like the aforementioned end plate 9, as shown in FIGS. 1B, 2(b), 6B and 8B, the gasket 22 is adhered with an adhesive sheet 26 to the inner end face of the adapter 18 that contacts the end face of the outer ring 2. The gasket 22 is thus adhered with the adhesive sheet 26 to the adapter 18, which is then attached to one axial end portion of the outer ring 2. At this time, the gasket 22 is fitted into an annular recessed portion 24 that is provided on the inner peripheral edge of the end face of the outer ring 2, such that the cylindrical portion 17' at the end portion of the adapter 18 is fitted onto the outer peripheral end portion of the outer ring 2. When the adapter 18 is fitted onto the outer ring 2, the gasket 22 secured to the adapter 18 with the adhesive sheet 26 facilitates the positioning of the gasket 22 with respect to the outer ring 2, thereby preventing the gasket 22 from being dislocated and providing reliable sealing performance. The cylindrical portion 17' of the adapter 18 is externally fitted into an annular groove 28 formed on the outer peripheral surface of the end portion of the outer ring 2, and then caulked radially inwardly at its peripheral edge to be thereby permanently coupled thereto. This allows the adapter 18 to be firmly incorporated into the outer ring 2.

It may also be acceptable to adhere the gasket 22 with the adhesive sheet to the annular recessed portion 24 that is provided on the inner peripheral edge of the end face of the outer ring 2. The adapter 18 is attached to the other axial end portion of the outer ring 2 to which the gasket 22 has been adhered with the adhesive sheet. When the adapter 18 is fitted onto the outer ring 2, the gasket 23 secured to the outer ring 2 with the adhesive sheet facilitates the positioning of the gasket 23 with respect to the outer ring 2, thereby preventing the gasket 23 from being dislocated and providing reliable sealing performance as in the case of the gasket 23 adhered to the adapter 18 with the adhesive sheet 27.

Figure 4B:
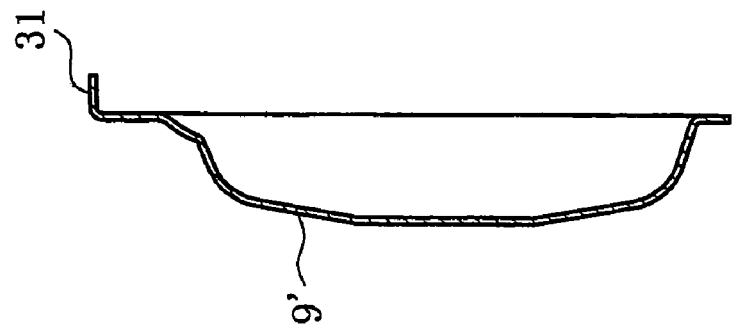
FIG. 4(b) is a cross sectional view taken along line A-O-B of FIG. 4(a)
Figure 4A:
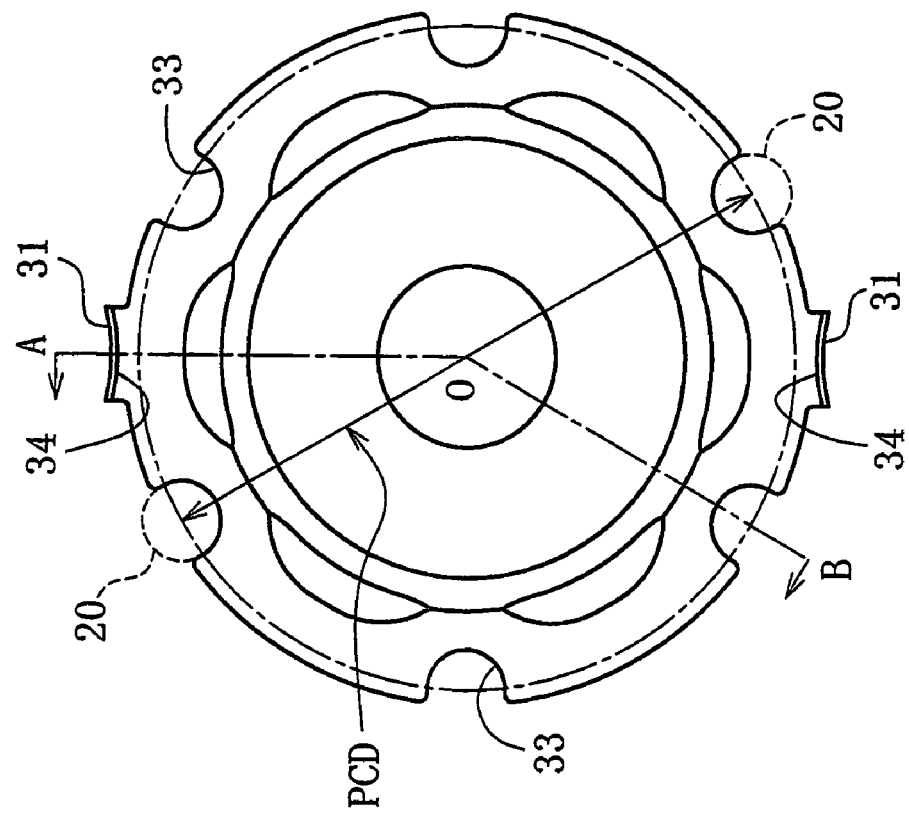
FIG. 4(a) is a side view illustrating an endplate according to another embodiment of the present invention.

In the aforementioned illustrated embodiment, the cylindrical portion 21' is formed on the entire outer periphery of the end plate 9; however, the present invention is not limited thereto but, for example, may employ an end plate 9' as shown in FIGS. 4(a) and 4(b).

Figure 5B:
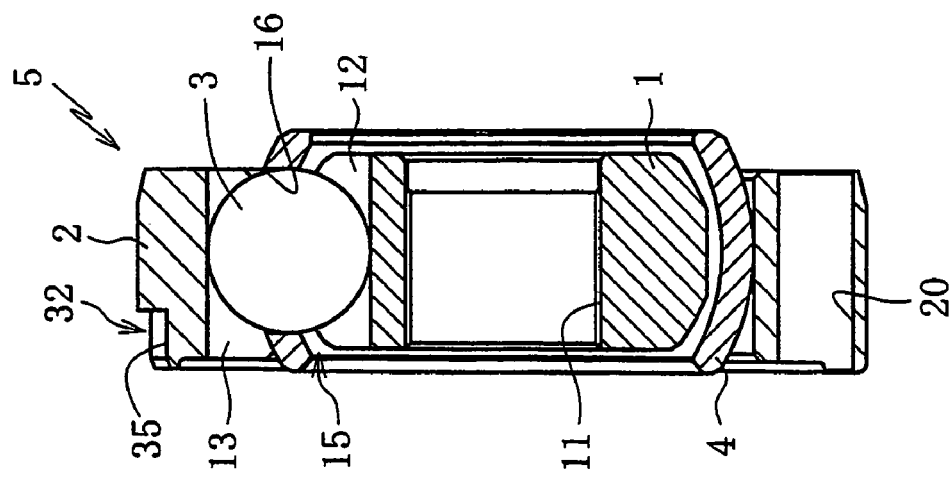
FIG. 5(b) is a cross sectional view taken along line A-O-B of FIG. 5(a)

As shown in FIGS. 4(a) and 4(b), the end plate 9' according to this embodiment has an outer diameter that is generally equal to the diameter of a pitch circle PCD of the bolts 20 (in FIG. 4(a), the alternate long and short dashed line indicates the pitch circle of the bolts 20). Additionally, the end plate 9' has two projected pieces 31, which extend axially toward the outer ring, on the outer peripheral edge of the end plate 9'. On the other hand, on the outer peripheral end portion of the outer ring 2 of the constant velocity universal joint 5, formed are recessed portions 32 for engaging the projected pieces 31 of the end plate 9' (see FIGS. 5(a) and 5(b)). On the outer periphery of the end plate 9', formed are notches 33 for accommodating the bolts 20 that penetrate the outer ring 2.

In the aforementioned embodiment, the end plate 9', having an outer diameter that is generally equal to the pitch circle diameter PCD of the bolts 20, allows the two projected pieces 31 to engage the recessed portions 32 of the outer ring 2 and is thereby attached to the outer ring 2. This in turn allows the companion flange 10 to be socket coupled to the outer peripheral end portion of the outer ring 2. This allows the companion flange 10 to directly contact the end face of the outer ring 2 closer to its outer periphery than the end plate 9'. This in turn makes it possible to provide highly accurate alignment between the companion flange 10 and the outer ring 2, or between the first shaft 6 and the second shaft 8 having the companion flange 10 via the outer ring 2.

The companion flange 10 having an end portion axially short in length can also be socket coupled to the outer ring 2. Additionally, before the companion flange 10 is press fitted onto the outer ring 2, the projected pieces 31 of the end plate 9' engage the recessed portions 32 of the outer ring 2 to thereby enable positioning of the end plate 9' and prevent it from dropping off during assembly.

Figure 5A:
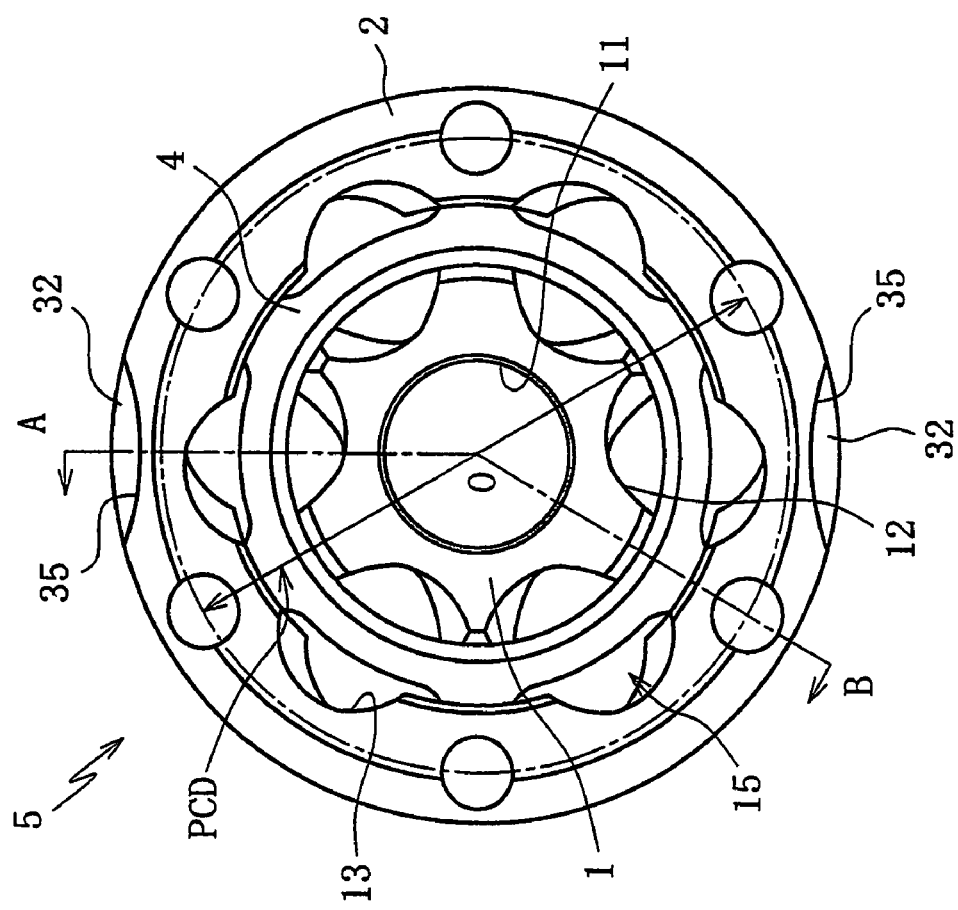
FIG. 5(a) is a side view illustrating a constant velocity universal joint according to another embodiment of the present invention.

As shown in FIG. 4(a), the projected pieces 31 of the end plate 9' have a protruded arc-shaped engagement face 34 for engaging the recessed portions 32 of the outer ring 2. Corresponding to this configuration, as shown in FIG. 5(a), the bottom face of the recessed portions 32 formed on the outer periphery of the end portion of the outer ring 2 has a recessed arc-shaped engagement face 35. Additionally, the recessed portions 32 formed on the outer peripheral end portion of the outer ring 2 are slightly longer than the axial length of the projected pieces 31 of the end plate 9'.

In the aforementioned embodiment, the present invention has been explained in accordance with a power transmission system incorporating the Lobro constant velocity universal joint 5 in which the track grooves 13 of the outer ring 2 and the track grooves 12 of the inner ring 1 are formed at a predetermined angle opposite to each other with respect to the axial line. However, the present invention is not limited thereto but may be applied to any constant velocity universal joints other than those of the Lobro type.

What is claimed is:

1. A power transmission system comprising:
a constant velocity universal joint having an inner joint member disposed rotatably and axially movably via rollers on a side of an inner periphery of an outer joint member;
a first shaft fitted into the inner joint member to enable torque transmission;
a boot with an adapter, wherein the boot is attached to the first shaft and one end portion of the outer joint member, respectively, to seal the constant velocity universal joint at one end; and
a second shaft having a flange coupled to the outer end portion of the outer joint member with bolts,
wherein a gasket is adhered with an adhesive sheet that is in direct contact with at least one of:
  a) an inner end face of the adapter and attached to a first axial end face of the outer joint member and an annular recessed portion provided on an inner peripheral edge of the first axial end face of the outer joint member,
  b) an end portion of the flange of the second shaft, and
  c) an annular recessed portion provided on an inner peripheral edge of a second axial end portion of the outer joint member.

2. The power transmission system according to claim 1, further comprising an end plate disposed between the flange of the second shaft and the second axial end portion of the outer joint member to seal the constant velocity universal joint, wherein an end gasket is adhered with the adhesive sheet to an inner end face of the end plate and attached to the second axial end portion of the outer joint member.

3. The power transmission system according to claim 1 or 2, wherein the flange of the second shaft is socket fitted onto the outer peripheral end portion of the outer joint member.

4. The power transmission system according to claim 1 or 2, wherein the constant velocity universal joint is formed to allow a plurality of track grooves to extend axially on the inner peripheral surface of the outer joint member, and allow a plurality of track grooves, opposite to the track grooves of the outer joint member, to extend axially on the outer peripheral surface of the inner joint member, and wherein the rollers are balls accommodated within ball tracks formed by pairs of the track grooves of the outer joint member and the track grooves of the inner joint member, and retained in a cage.

5. The power transmission system according to claim 4, wherein the track grooves of the outer joint member and the track grooves of the inner joint member are inclined opposite to each other by a predetermined angle with respect to an axial line.

6. The power transmission system according to claim 1 or 2, wherein the constant velocity universal joint comprises the outer joint member having three track grooves formed axially on its inner peripheral portion, each track groove having, on its both sides, an axial roller guide surface, respectively, the inner joint member having three leg shafts projected radially, rollers accommodated within the track grooves of the outer joint member, and a ring externally fitted onto the leg shafts to rotatably support the rollers, the rollers being movable in the axial direction of the outer joint member along the roller guide surfaces.

7. The power transmission system according to claim 2, wherein a cylindrical portion is formed on at least one of the end plate and the adapter at an outer periphery thereof and externally fitted into an annular groove formed on an outer peripheral surface at an end portion of the outer joint member, the cylindrical portion being caulked radially inwardly at its peripheral edge to be permanently coupled to the annular groove.

8. The power transmission system according to claim 2 or 7, wherein an outer diameter of the end plate is generally equal to a pitch circle diameter of the bolts, and at least two projected pieces extending axially toward the outer joint member are formed on an outer peripheral edge of the end plate, the projected pieces engaging recessed portions formed on an outer peripheral end portion of the outer joint member.

9. The power transmission system according to claim 1, wherein a cylindrical portion is formed on an outer periphery of the adapter and externally fitted into an annular groove formed on an outer peripheral surface at an end portion of the outer joint member, the cylindrical portion being caulked radially inwardly at its peripheral edge to be permanently coupled to the annular groove.

* * * * *